United States Patent

Stegavig et al.

[11] 4,065,041
[45] Dec. 27, 1977

[54] WRAP-AROUND ROOF RACK

[76] Inventors: Clifford Arnold Stegavig, 1500 6th Avenue E., Prince Rupert, British Columbia, Canada, V8J 1Y2; David McNair Stringer, 1506 7th Avenue E., Prince Rupert, British Columbia, Canada, V8J 2K3

[21] Appl. No.: 698,476

[22] Filed: June 21, 1976

[30] Foreign Application Priority Data

June 25, 1975 Canada .................................. 230122

[51] Int. Cl.² ............................................. B60R 9/04
[52] U.S. Cl. .......................... 224/42.1 D; 224/42.1 E; 296/3; 296/102
[58] Field of Search ...................... 224/42.1 D, 42.1 E, 224/42.1 F, 42.1 R, 42.1 H, 29 R, 42.45 R; 214/450, DIG. 7; 280/756, 770; 296/23 MC, 23 B, 3, 102, 137 R, 137 B

[56] References Cited

U.S. PATENT DOCUMENTS

| 1,804,868 | 5/1931 | Gage | 224/42.1 E |
| 2,846,262 | 8/1958 | Ray | 296/102 X |
| 2,946,397 | 7/1960 | Berberich | 214/450 X |
| 3,552,514 | 1/1971 | Alpers | 280/756 X |
| 3,589,576 | 6/1971 | Rinkle | 224/42.1 E X |
| 3,594,035 | 7/1971 | Ferguson | 296/3 |

FOREIGN PATENT DOCUMENTS 2,347,917  4/1975  Germany ............................ 280/756

*Primary Examiner*—Lawrence J. Oresky
*Assistant Examiner*—Jerold M. Forsberg
*Attorney, Agent, or Firm*—Fetherstonhaugh & Co.

[57] ABSTRACT

A rack for a recreational vehicle having a rear portion formed with a longitudinal sill at each side. The rack comprises spaced first and second runners adapted to be located on the longitudinal sills of the rear portion of the vehicle. A plurality of load-bearing members extend upwardly and across the vehicle between the first and second runners. Any load carried by the load-bearing members acts downwardly on the sills which are well able to carry considerable loads.

7 Claims, 2 Drawing Figures

U.S. Patent     Dec. 27, 1977     4,065,041
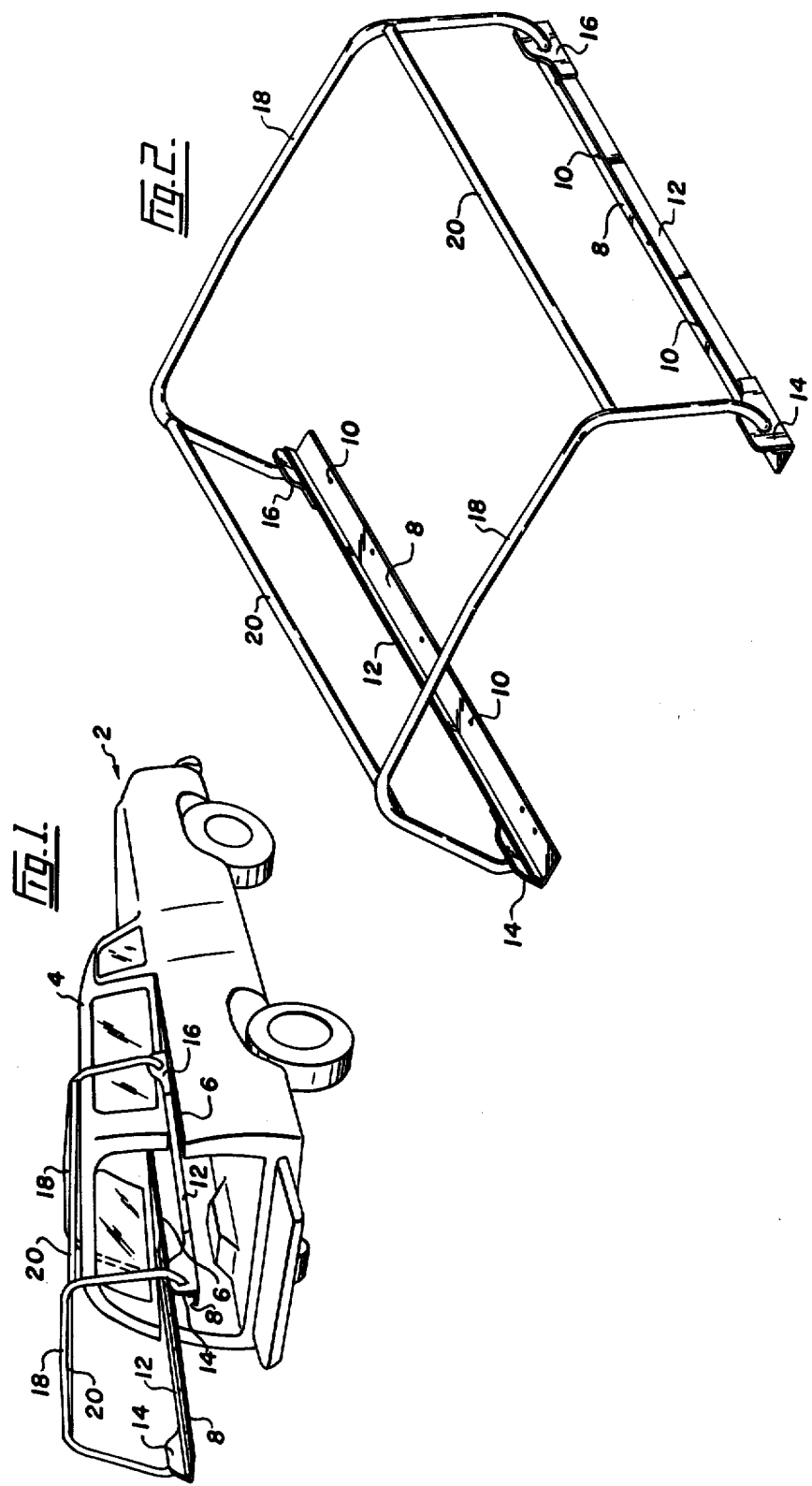

WRAP-AROUND ROOF RACK

FIELD OF THE INVENTION

This invention relates to a rack for a recreational vehicle.

DESCRIPTION OF THE PRIOR ART

Recreational vehicles, for example those available under the trade makrs "Jimmy", "Blazer" and "Ram Charger" are increasingly popular. Typically such vehicles have a detachable hard top for the rear portion or box, behind the cab, made of a reinforced plastic. These vehicles are designed to carry large loads but a disadvantage is that the reinforced hard top is not able to take a large load, for example, a load applied to a roof rack mounted on the hard top. The present invention, therefore, seeks to provide a rack useful on such vehicles that does not place any stress on the detachable hard top.

SUMMARY OF THE INVENTION

Accordingly, the present invention is a rack for a recreational vehicle having a rear portion formed with a longitudinal sill at each side and including a body supported by the sills and generally enclosing the rear portion, the body having side walls a roof of relatively poor load-bearing characteristics, the rack comprising: spaced first and second runners adapted to be located on the longitudinal sills between the body and the sills, and a plurality of load bearing membes for extending upwardly and across the vehicle between the first and second runners externally of the side walls and roof of the body and for carrying loads above the roof.

The rack of the present invention is useful on the above recreational vehicles whether the detachable hardtop is present or not.

BRIEF DESCRIPTION OF THE DRAWINGS

The invention is illustrated, by way of example, in the accompanying drawings in which, FIG. 1 is a view of a recreational vehicle partially fitted with a rack according to the present invention; and FIG. 2 is a perspective view of a rack according to the invention.

DESCRIPTION OF PREFERRED EMBODIMENT

FIG. 1 illustrates a vehicle 2 provided with a detachable hard top 4. The hard top 4 is normally attached to longitudinal sills 6 formed at each side of the rear portion of the vehicle 2, typically by bolting.

As illustrated in FIG. 2 the rack comprises spaced first and second runners 8 which are adapted to be located on the longitudinal sills 6 of the vehicle 2 by the provision of holes 10. These holes 10 are formed in the runners 8 at positions that correspond to, and form pairs with, holes formed in the silss 6 of the vehicle in order that the roof 4 may be located on the vehicle 2. In the illustrated embodiment the runners 8 have upwardly extending bracing portions 12. Ideally the runners 8 may be formed integrally with the bracing pieces 12. For example, the two pieces may be combined as angle bar.

The illustrated rack is formed with a first pair of lugs 14 at its rear and a second pair of lugs 16 at its forward end. Load bearing members 18 extend upwardly from each one of lugs 14 and 16 across to a corresponding lug 14 or 16. The illustrated rack has two load bearing members 18 but, clearly, may be formed with as many as desired.

The illustrated embodiment of the invention has longitudinal bracing pieces 20 extending between the load bearing members 18.

The rack of the present invention is located on the vehicle 2 with ease. If the vehicle is not equipped with a roof 4 the rack is positioned on the sills 6 of the vehicle. Bolts are placed through the holes 10 and in the corresponding holes in the sills 6 (which are normally positioned there to receive a roof) and tightened in position with nuts.

If a roof is required on the vehicle, the following procedure is followed:

The bolts locating the roof 4 on each sill 6 are removed. The front bolts that hold the roof to the windshield, for example, on the vehicle available under the trade mark "Blazer", are loosened and, if necessary, the interior light wires are loosened. The roof is then lifted up approximately 4 to 5 inches and propped in that lifted position. The rack is slid between the roof and the sills of the vehicle. The prop is removed and the roof lowered onto the runners 8 supported by the sills 6. The bolts that originally just held the roof in position on the sill are then reinserted and the nuts tightened on them. The light is reconnected, if necessary, and the bolts holding the roof to the windshield are retightened.

It may be desirable to insert a sealer, for example, of a silicone compound, between the upper surfaces of the sills 6 and the lower surface of the runners 8.

Once installed the rack is solidly mounted, indeed its area of contact with the vehicle is considerably greater than with a conventional roof rack. It is therefore capable of withstanding considerable loads.

In a particularly preferred embodiment the rack is made of aluminum. The load bearing members 18 and the bracing members 20 may be of aluminum tubing. p It should be emphasized that bracing portion 12 and lugs 14 are not essential. The load-bearing members 18 may be attached directly to runners 8 if desired. Small outward extensions may form at the aproppriate position on the edges of runners 8 to facilitate attachment of the members 18.

We claim:

1. A rack for a recreational vehicle having a rear portion formed with a longitudinal sill at each side and including a body supported by the sills and generally enclosing the rear portion, the body having side walls and a roof of relatively poor load-bearing characteristics, the rack comprising:

spaced first and second runners adapted to be located on the longitudinal sills between the body and the sills;

a plurality of load-bearing members for extending upwardly and across the vehicle between the first and second runners externally of the side walls and roof of the body and for carrying loads above the roof.

2. A rack as claimed in claim 1 in which a plurality of lugs extend from each runner, each lug being substantially aligned with a lug on the other runner to form a pair of lugs and in which the load-bearing members extend upwardly and across the vehicle between the two lugs of a pair.

3. A rack as claimed in claim 1 provided with longitudinal bracing pieces that extend between adjacent load bearing members.

4. A rack as claimed in claim 1 in which the rack has two load bearing members.

5. A rack as claimed in claim 1 in which the first and second runners are adapted to be located on the sills of the rear portion of the vehicle by having spaced holes, each hole positioned to correspond to and form a pair with a hole in a sill, so that attachment means can be positioned through each pair of holes.

6. A rack as claimed in claim 1 including bracing portions extending upwardly from each runner.

7. A rack as claimed in claim 5 in which the runners and the bracing portions are formed from metal angle bar.

* * * * *